United States Patent
Lee

[19]

[11] Patent Number: 5,881,183
[45] Date of Patent: Mar. 9, 1999

[54] METHOD AND DEVICE FOR ENCODING OBJECT CONTOUR BY USING CENTROID

[75] Inventor: Shi-hwa Lee, Seocho, Rep. of Korea

[73] Assignee: Samsung Electronics Company, Ltd., Suwon City, Rep. of Korea

[21] Appl. No.: 822,662

[22] Filed: Mar. 24, 1997

[30] Foreign Application Priority Data

Mar. 23, 1996 [KR] Rep. of Korea ............. 1996 8020

[51] Int. Cl.[6] ........................................... G06K 9/00
[52] U.S. Cl. ........................................... 382/288; 382/243
[58] Field of Search ........................................... 382/153, 288, 382/294, 185, 202, 243, 242, 197, 138, 186, 161, 241, 152, 154, 168, 175, 181, 190, 195, 203, 209, 217, 224, 225, 196, 198, 199, 286, 287, 291, 292; 358/261.3; 706/31, 20, 25; 345/170, 184; 348/403, 172; 250/203.5

[56] References Cited

U.S. PATENT DOCUMENTS

| | | | |
|---|---|---|---|
| 4,004,083 | 1/1977 | Norem | 358/125 |
| 4,758,979 | 7/1988 | Chiao-Yueh | 382/243 |
| 5,073,955 | 12/1991 | Evers | 382/197 |
| 5,220,619 | 6/1993 | Keokoek | 382/288 |
| 5,233,671 | 8/1993 | Murayama | 382/242 |
| 5,303,311 | 4/1994 | Epting et al. | 382/197 |
| 5,553,196 | 9/1996 | Takatori et al. | 399/24 |
| 5,600,772 | 2/1997 | Zhou et al. | 382/242 |
| 5,691,769 | 11/1997 | Kim | 382/242 |
| 5,710,838 | 1/1998 | Jung | 382/242 |
| 5,805,736 | 9/1998 | Kim | 382/242 |

OTHER PUBLICATIONS

Kim et al., "International Organization for Standardization Organization International de Normalization *ISO/IEC JTC1/SC29/WG11* Coding of Moving Pictures and Associated Audio", (1995) pp. 1–9 –ISO/IEC.JTC1.

Gerken, "Object–Based Analysis–Systhesis Coding of Image Sequences at Very Low Bit Rates", IEEE Transactions on Circuits and Systems for Video Technology, vol. 4, No. 3, (1994) pp. 228–235.

Lerman et al., "Multiresolution Chain Coding of Contours", IEEE, (1994) pp. 615–619, (No Place of Public).

Gu et al., "Efficient Contour Prediction Error Coding", Signal Processing Laboratory, Swiss Federal Institute of Technology, pp. 321–324–(No Date or Place of Public).

*Primary Examiner*—Leo H. Boudreau
*Assistant Examiner*—Bijan Tadayon
*Attorney, Agent, or Firm*—Foley & Lardner

[57] ABSTRACT

A centroid-based object contour encoding method and device for encoding still images and moving pictures by rendering a more accurate contour representation with increased compression. The method includes the determination of a centroid and incrementing angle, the determination of distances between the centroid and boundary pixels on an object, and the encoding of the information determined. For moving pictures, the difference between the data of a current frame and the data of a previous frame are encoded by discrete cosine transforming and variable-length coding of the difference data.

25 Claims, 13 Drawing Sheets

OBJECT IN
(K - 1)th FRAME

OBJECT IN
(K)th FRAME

METHOD AND DEVICE FOR ENCODING OBJECT CONTOUR BY USING CENTROID

BACKGROUND OF THE INVENTION

1. Field of the Invention

The present invention relates to a method and device for encoding an object contour by using a centroid. More particularly, the present invention relates to a method for encoding an object contour by sequentially measuring distances between a centroid and boundary pixels on a contour of the object and encoding the distances. The present invention also relates to a device suitable for the above-mentioned method.

2. Description of the Related Arts

Object contour coding is essential in object-based coding for both still images and moving pictures. Particularly, in a low bit rate coding such as MPEG4, the coding scheme has to show a high compression rate in order to minimize the bit amounts of the coded data while it provides a detailed representation of an original contour.

The most widely used contour-coding technique is chain coding which is generally used in computer graphics. In chain coding, a codeword is defined for each direction (among 360°), and a contour is traced in a given direction and encoded by using the codeword defined for the direction. The chain coding, however, results in too much bit allocation and has difficulty in taking into account temporal redundancy in a sequence of images, as in a motion picture, even though there is no loss in contour information and the original contour is recovered accurately.

To overcome these drawbacks of the chain coding, several methods seeking compromise between the accuracy and the bit allocation have been proposed. Though such methods can reduce the amount of generated bits, the fundamental drawbacks of the chain coding persist.

There are many image processing applications which are satisfied with merely a rough representation of an object contour. On such applications, other contour coding methods have been used, which reduce the bit allocation required to encode the contour at the cost of failing to provide complete contour information. One of such methods is polygonal approximation, in which the entire contour of an object is approximated by an inner or outer polygon. Despite its strong advantage in bit economy, the polygonal approximation provides only a very rough representation of the contour.

To circumvent the problem of polygonal approximation, a spline approximation method has been employed. Whereas a contour is approximated by line segments in the conventional polygonal approximation method, the spline approximation achieves a more accurate contour representation with the same number of bits, by using non-linear elements, e.g., curves. Meanwhile, spline approximation may be replaced with a discrete sine transform (DST) operation which renders a detailed representation of a more complex contour but with the efficiency of polygonal approximation.

FIG. 1 conceptually illustrates a contour coding method which uses a combination of polygonal approximation and DST operation. Here, a contour is divided into contour segments 10 and each contour segment is approximated as a line segment by the polygonal approximation. After segmentation or line approximation, i.e., polygon approximation, an approximation error 12 which is the distance between the contour segment and the line segment of the polygon is sampled at a predetermined number of positions or angles along the contour. The sampled error values are encoded by carrying out DST and quantization. This coding exhibits low bit consumption and can represent a contour more accurately.

However, all the coding methods described above are limited to contour coding for still images only.

In a moving picture, since each object in consecutive frames retains nearly the same shape and nearly the same position, temporary redundancy also exists in the contour of the object. Thus, the efficiency of the contour coding for a moving picture can be enhanced by taking advantage of such temporal redundancy. In an example of an object contour coding of a moving picture, the object of a (k)th frame is piled on the object of a (k-1)th frame. Then, parts of the contour which are not duplicated are extracted and chain-coded. However, when the contours change fast, there are so many contour segments to be encoded, and the starting point coordinates should be encoded frequently, so that the coding efficiency deteriorates ultimately.

SUMMARY OF THE INVENTION

To overcome the above problems, it is an object of the present invention to provide a contour encoding method for encoding moving pictures as well as still images, in which distances between a centroid and boundary pixels on a contour of the object are measured sequentially and encoded.

It is another object of the present invention to provide an image encoding device which is suitable for the above method.

To achieve one of the objects above, there is provided a centroid-based object contour encoding method comprising the steps of: determining a centroid of points inside an object; determining an incrementing angle for sampling; obtaining distances between the centroid and boundary pixels on a contour of the object by changing an angle by the incrementing angle; and encoding the distances and a coordinate of the centroid.

To achieve one of the objects above, there is also provided a centroid-based object contour encoding method comprising the steps of: determining a centroid of points inside an object; determining an incrementing angle for sampling; obtaining distances between the centroid and boundary pixels on a contour of the object by changing an angle by the incrementing angle; and encoding the difference between the distance of the centroid and boundary pixels on a contour of the object in a current frame and in a previous frame, and the difference between a coordinate of the centroid of the object in the current frame and in the previous frame.

To achieve another one of the objects above, there is provided a centroid-based object contour coding device comprising: distance extracting means for obtaining distances between a centroid of points inside an object and boundary pixels on a contour of the object by changing an angle by the incrementing angle; and means for encoding the difference between the distance of the centroid and boundary pixels on a contour of the object in a current frame which is output by the distance extracting means and that in a previous frame, and the difference between a coordinate of the centroid of the object in the current frame and in the previous frame.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

The centroid-based object contour coding method and device of the present invention which are applied to both still images and moving pictures, can be implemented on a general purpose computer capable of MPEG calculations and/or image manipulation. Such general purpose computers include any hardware capable of running special purpose software designed to implement a centroid-based object contour coding method, or any devices that would be well known to one of ordinary skill in the art.

The centroid-based object contour coding method for both still images and moving pictures relies on the fact that the distances between a centroid and boundary pixels on a contour are similar to one another within a predetermined angle range. Thus, effective energy concentration can be expected when an operation such as a discrete cosine transform (DCT) is carried out. In addition, since the change in the contour is small between adjacent frames, the distances between a centroid and boundary pixels on a contour are similar to the respective distances in the previous frame. Therefore, the difference between corresponding distances is very small in adjacent frames, and thus effective coding can be obtained by performing a DCT-operation of this difference value.

Figure 1:
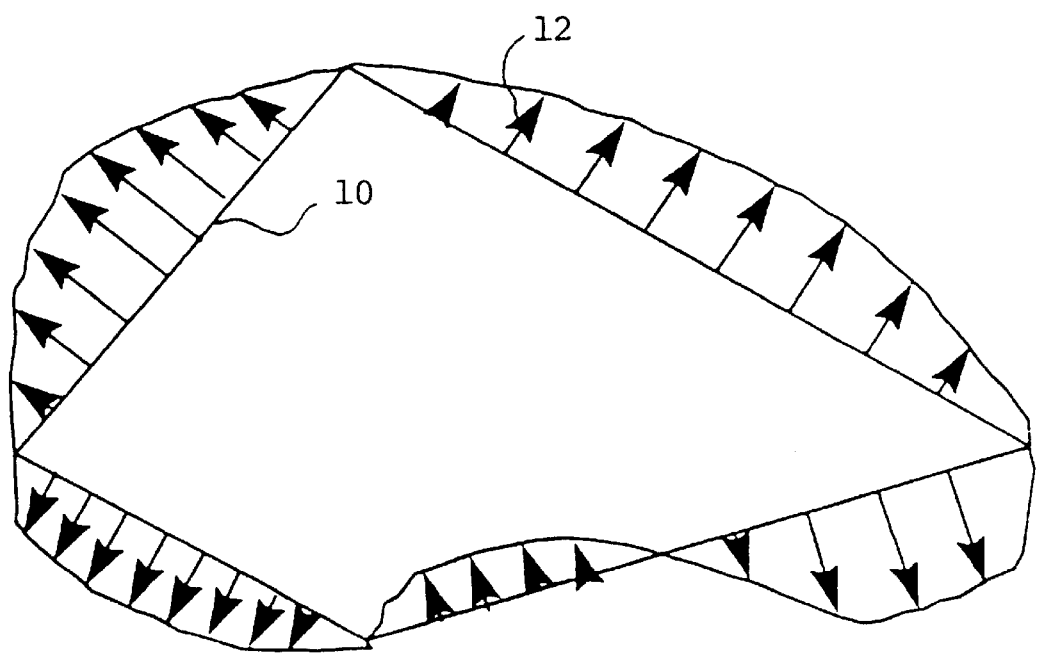
FIG. 1 conceptually illustrates a contour coding method which uses a combination of polygonal approximation and DST operation.
Figure 2:
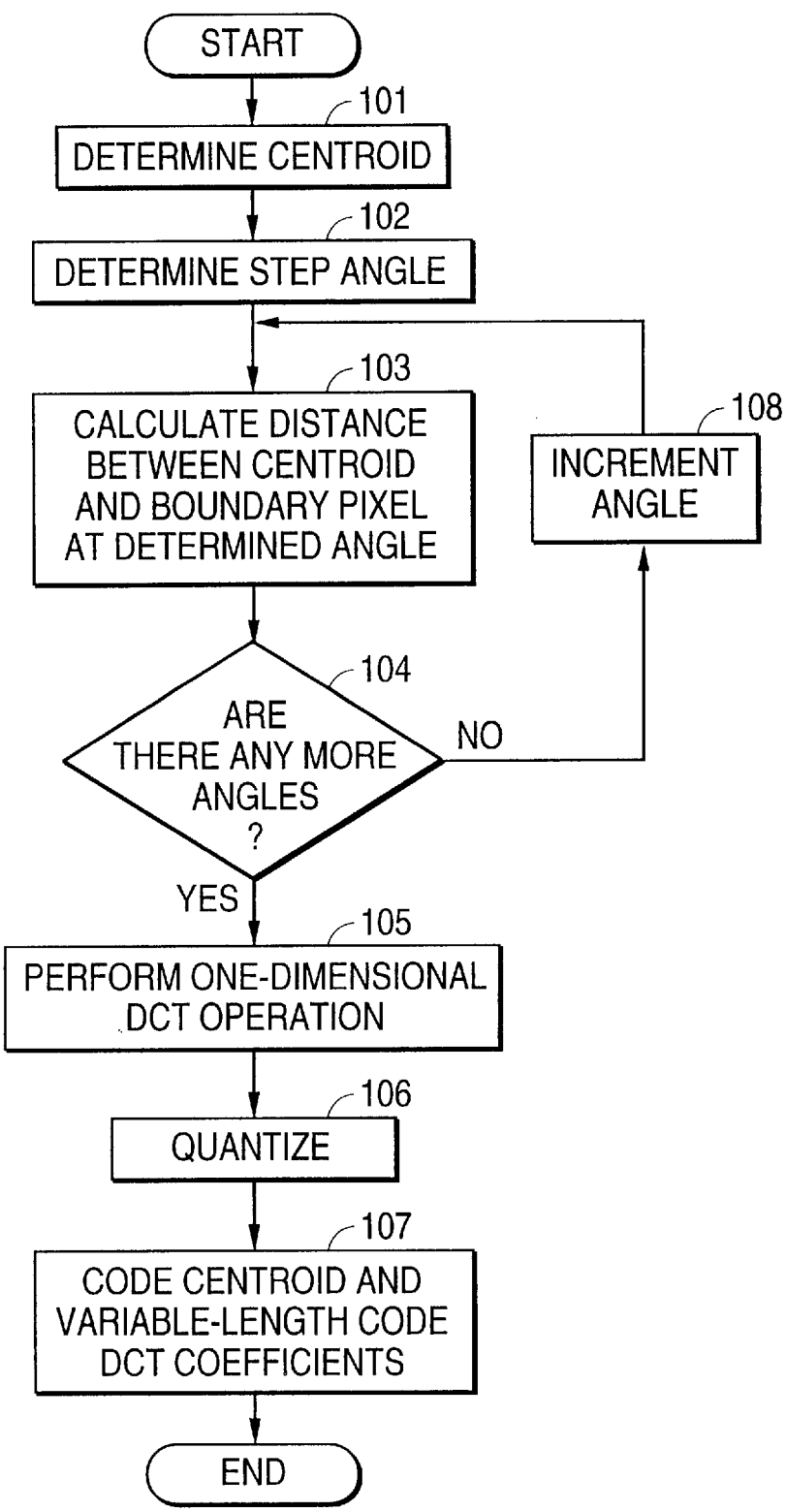
FIG. 2 is a flowchart for explaining a contour coding method for a still image, according to the present invention.

FIG. 2 is a flowchart for explaining a centroid-based object contour coding method applied to a still image, according to the present invention.

In step 101, a centroid is determined. The centroid $(C_x, C_y)$ is first defined by equations (1) and (2):

$$C_x = \frac{\sum_{i,j} k_{(i,j)} i}{\sum_{i,j} k_{(i,j)}} \quad (1)$$

$$C_y = \frac{\sum_{i,j} k_{(i,j)} j}{\sum_{i,j} k_{(i,j)}} \quad (2)$$

where (i,j) is a coordinate of a point in a region in which the object is included, and $k_{(i,j)}$ equals "1" when (i,j) is inside the object and equals "0" otherwise.

Figure 3:
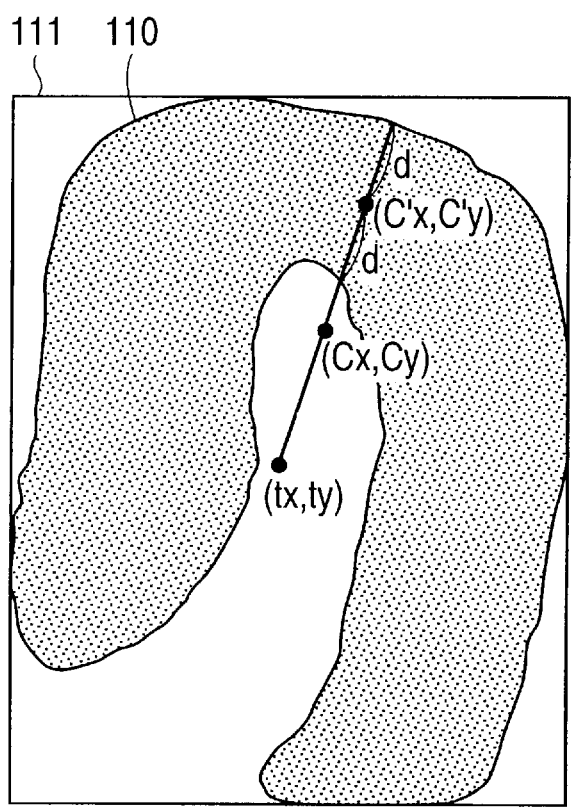
FIG. 3 illustrates an example of setting a pseudo-centroid when the centroid does not fall inside an object.

When the centroid obtained by the above equations is not inside the object, a pseudo-centroid $(C'_x, C'_y)$ is obtained as shown in FIG. 3. In FIG. 3, $(t_x, t_y)$ denotes the geometrical center of a rectangle 111 which is the smallest and encompasses an object 110. The pseudo-centroid $(C'_x, C'_y)$ is the central point of a line segment which passes the points $(t_x, t_y)$ and $(C_x, C_y)$ when it is extended and is divided by the contour of the object.

In step 102, an incrementing angle or the sampling angle for sampling is determined. Here, the incrementing angle can be adjusted according to object size and contour complexity. Specifically, the incrementing angle is determined by equation (3) as follows:

$$\theta = \sin^{-1} \frac{1}{L_{max}} \quad (3)$$

where, $L_{max}$ is the greatest one of the distances between the centroid and a point on the contour of the object. Here, the greater the distance $L_{max}$ is, the smaller the incrementing angle $\theta$ is and the greater number of sampled distances there are. Therefore, in some applications of the present invention, the incrementing angle can be determined by use of L which is smaller than the $L_{max}$ as follows:

$$\theta = \sin^{-1} \frac{1}{L} \quad (4)$$

under the constrains that does not result in excess loss or error. Meanwhile, in an alternative of the present embodiment, a specific value, e.g., 1° or 10°, can be used for the incrementing angle regardless of the shape of the object.

Figure 4A:
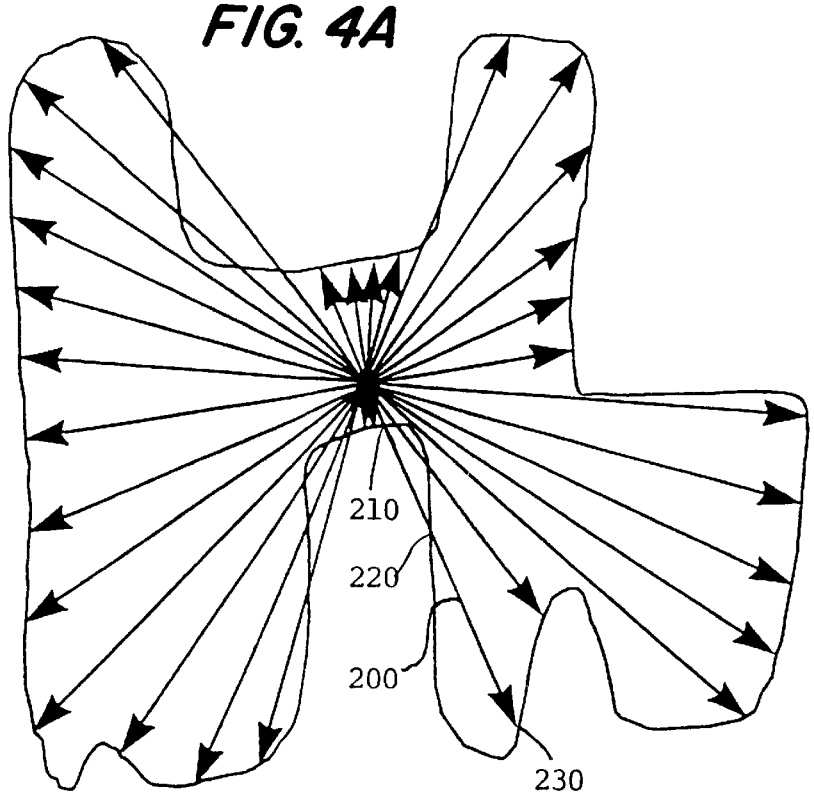
FIG. 4A illustrates an example of distances between a contour and a centroid with an angle.
Figure 4B:
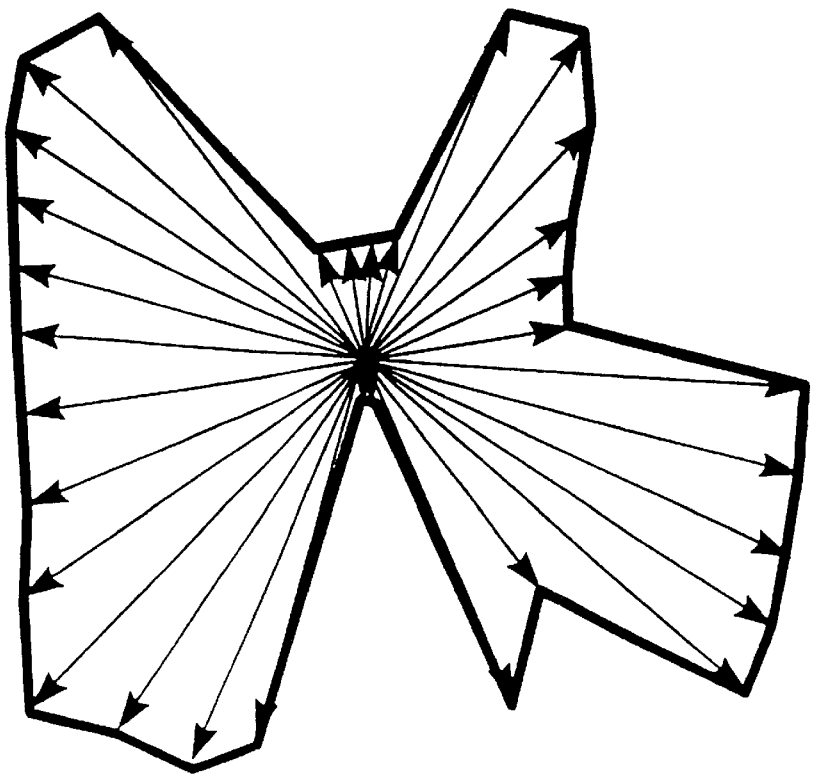
FIG. 4B illustrates an example of a contour encoded by using the distance information of FIG. 4A.

In step 103, the boundary pixel of the contour is determined along a predetermined direction from the determined centroid, and the distance between contour and centroid is calculated. If, as in FIG. 4A, more than one boundary pixel exists on a long an arrow 200 (such as boundary pixels 210, 220, and 230), the distance is determined to be the farthest pixel 230. The reason for that determination is a contour reproduced first can include most of the object when the farthest distance is used as shown in FIG. 4B.

Figure 4C:
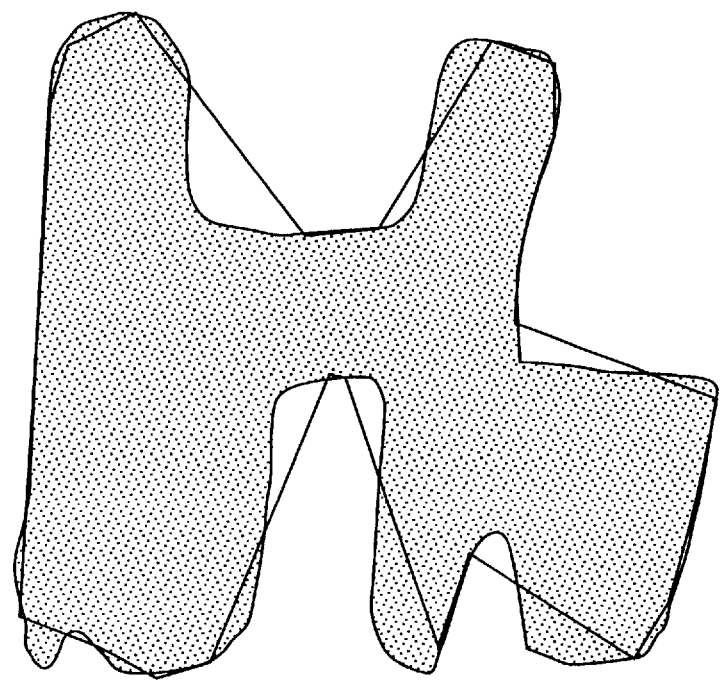
FIG. 4C illustrates errors between an original contour and a restored contour.

In order to obtain a more accurate representation of the contour, gaps between the original object contour and the first reproduced one are obtained as shown in FIG. 4C. If each of the gap is larger than a predetermined size, the overall encoding method shown in FIG. 2 is carried out for the gap to encode the contour of the gap. This procedure can be repeatedly performed depending on the desired accuracy of contour representation. The coding of the gaps requires only small bit allocations since the incrementing angle for sampling can be made larger than that of the first contour representation. For a final contour representation, the contour obtained after the second representation is added or subtracted from the first represented contour, thereby obtaining an accurate representation of the original contour.

In step 104, it is determined whether the above procedure has been performed for every angle, i.e., for 360°. If it is determined that the above procedure has not been performed for every angle, the angle is incremented in step 108 and step 103 is executed again.

Figure 5:
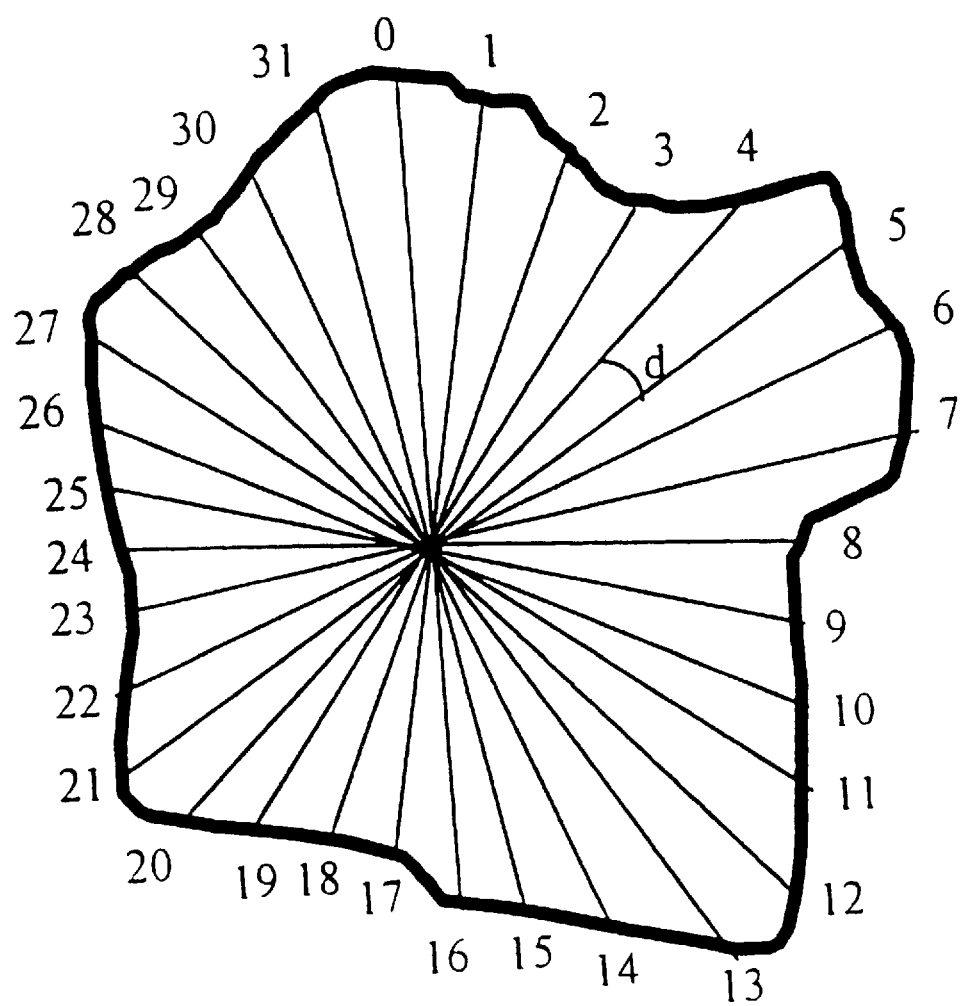
FIG. 5 illustrates an example of the distances between a centroid and boundary pixels on a contour with the incrementing angle d.

FIG. 5 illustrates the distances between a centroid and boundary pixels 0–31 on the contour which are calculated through steps 103, 104 and 108 when the incrementing angle d is 11.25°.

Figure 6A:
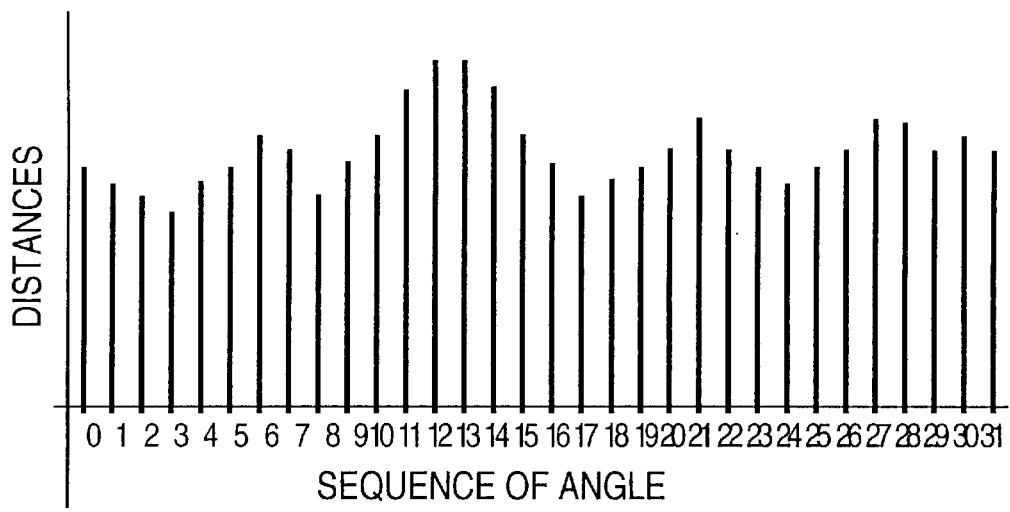
FIGS. 6A and 6B are graphs illustrating the sequentially calculated distances and discrete cosine transform (DCT) coefficients obtained therefrom, respectively.
Figure 6B:
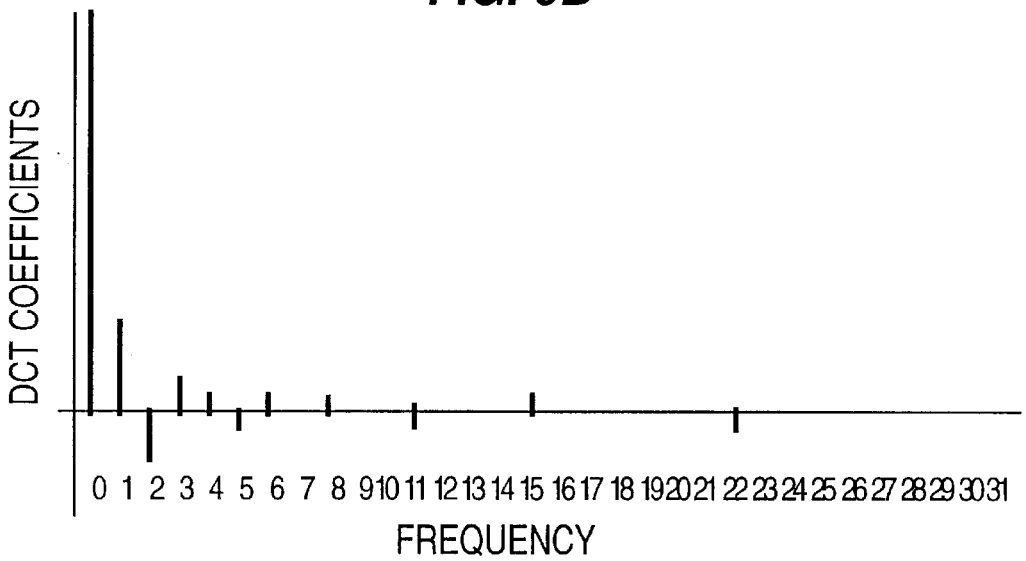

In step 105, one-dimensional DCT is carried out for the distances calculated through steps 103, 104 and 108. Here, effective information concentration can be expected by DCT operation, since the calculated distances are similar to those of adjacent distances. FIG. 6A illustrates the calculated distance values, and FIG. 6B illustrates DCT coefficients obtained from the calculated distance values.

In step 106, DCT coefficients of the distance information are quantized.

In step 107, the coordinate of the centroid is coded, and the DCT coefficients quantized in step 106 are variable-length coded, thereby generating final coded data.

In the present invention, object contour coding can be effectively performed for moving pictures as well as still images.

Figure 7A:
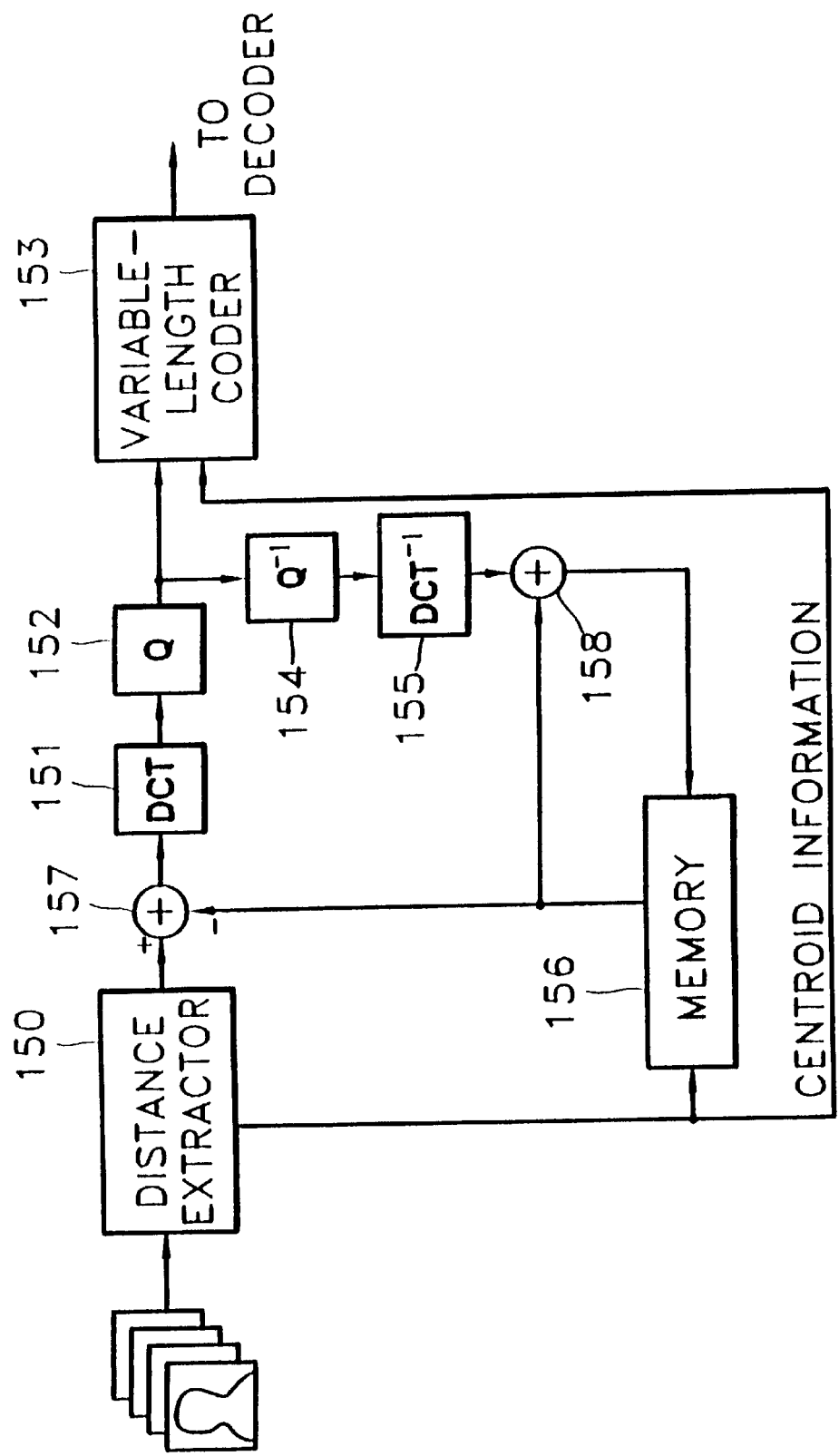
FIGS. 7A and 7B are block diagrams of moving picture contour encoding and decoding devices, respectively, according to the present invention.

FIG. 7A is a block diagram of a contour encoding device for moving pictures according to the present invention. The contour coding device includes a distance extractor 150, a DCT circuit 151, a quantizer (Q) 152, a variable-length coder 153, an inverse-quantizer 154, an inverse-DCT circuit 155, a memory 156, a subtractor 157, and an adder 158.

The distance extractor 150 calculates the distances between the determined centroid and the contour. The DCT circuit 151, the quantizer 152 and the variable-length coder 153 serve to encode the distances by carrying out the steps 105–107 in FIG. 2. Meanwhile, to encode the centroid, the difference between restored centroid coordinates of an image in the previous frame and that of the current frame is encoded. The inverse-quantizer 154 performs inverse-quantization of the quantized DCT coefficients, and the inverse-DCT circuit 155 performs inverse DCT-operation for the data output by the inverse-quantizer 154.

In the case of a moving picture, the difference between a contour of an object in a previous frame which is stored in the memory 156 and a contour of a current frame is calculated in the subtractor 157, so long as the object does not belong to the first frame and is not a new one. The difference is applied to the DCT circuit 151. In this case, data generated in the inverse-DCT circuit 155, which is the inverse-DCT value of the contour difference, is added to a contour stored in the memory 156 in the adder 158, thereby obtaining a new contour. The new contour is stored in the memory 156 and used for coding the succeeding contour information.

On the other hand, the encoding device of FIG. 7A can be used for contour coding of still images without structural modification.

Figure 7B:
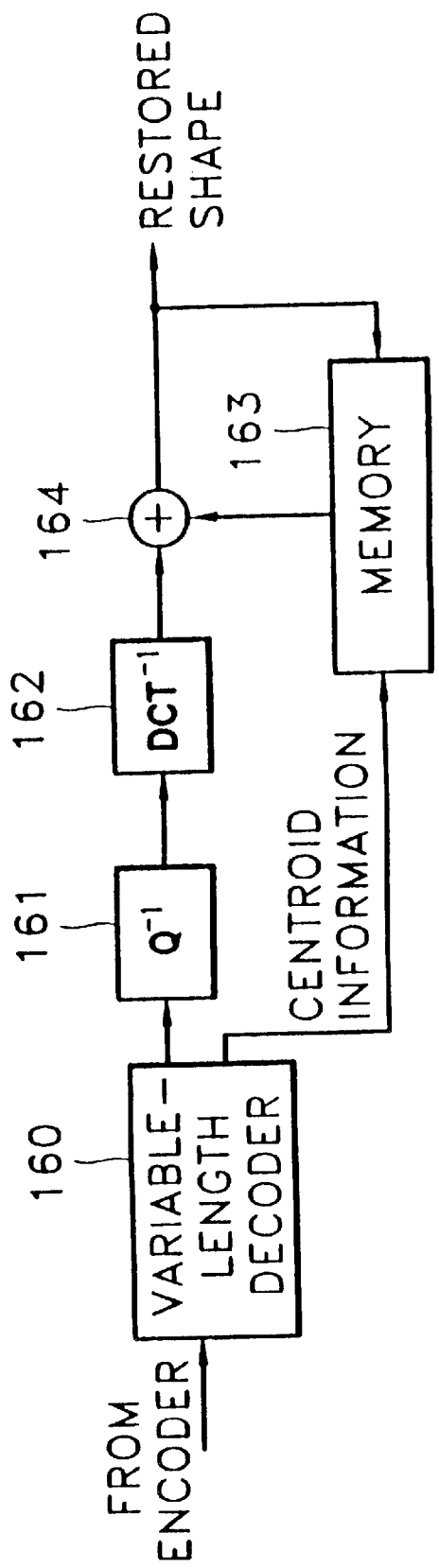

FIG. 7B is a block diagram of a decoding device for decoding the contour information coded in the encoding device of FIG. 7A. The decoding device includes a variable-length decoder 160, an inverse-quantizer 161, an inverse-DCT circuit 162, a memory 163, and an adder 164.

The variable-length decoder 160 determines whether a received bit stream is DCT coefficients of contour information or those of centroid information. The inverse-quantizer 161 and the inverse-DCT circuit 162 perform inverse quantization and inverse DCT-operation of the DCT coefficient of the contour information, respectively, in the same manner as the quantizer 154 and the inverse-DCT circuit 155 of FIG. 7A. The adder 164 adds inversely DCT-operated contour information to contour information stored in the memory 163, thereby producing new contour information and storing the new contour information in the memory 163.

Figure 8:
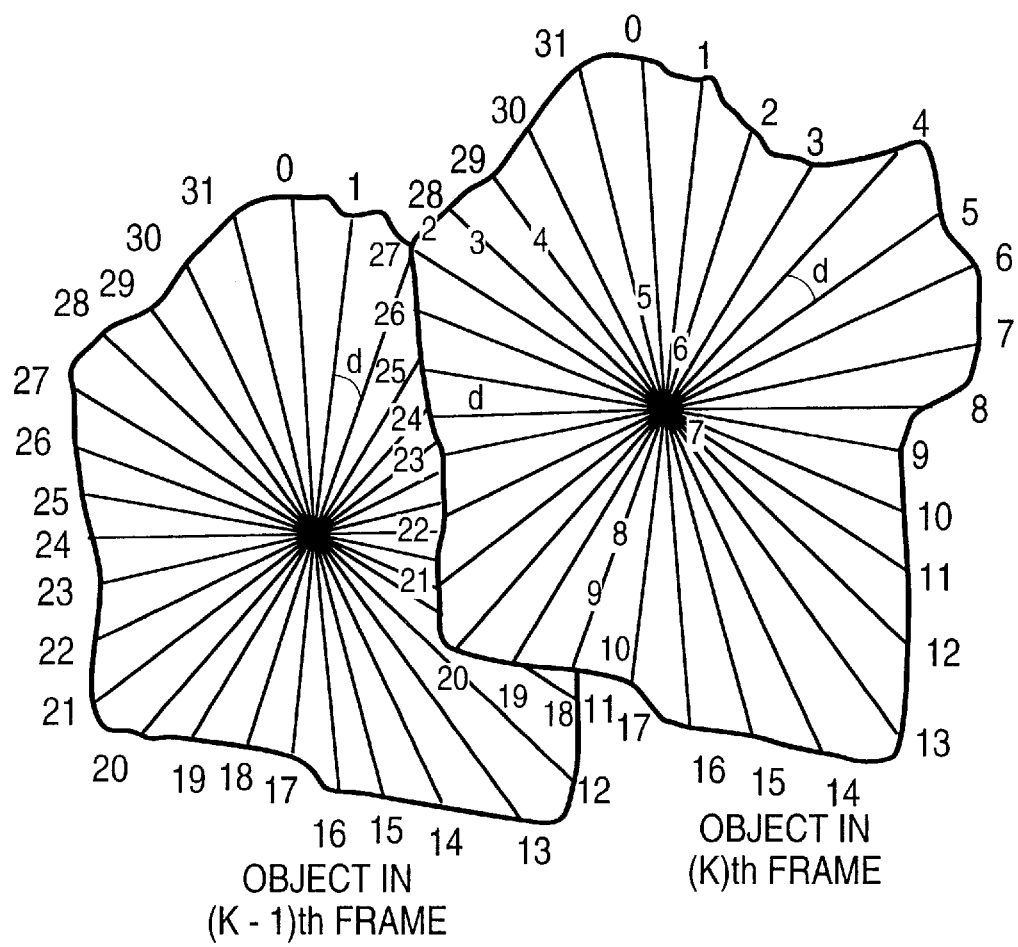
FIG. 8 illustrates an example of the contour, centroid, sampling angles, and sampled distances of an object in (k−1)th and (k)th frames.

FIG. 8 illustrates the contour, centroid, sampling angles, and sampled distances of an object in (k−1)th and (k)th frames extracted from the distance extractor 150 of FIG. 7A. Here, information of the object in a (k−1)th frame is stored in the memory 156 of FIG. 7A.

Figure 9A:
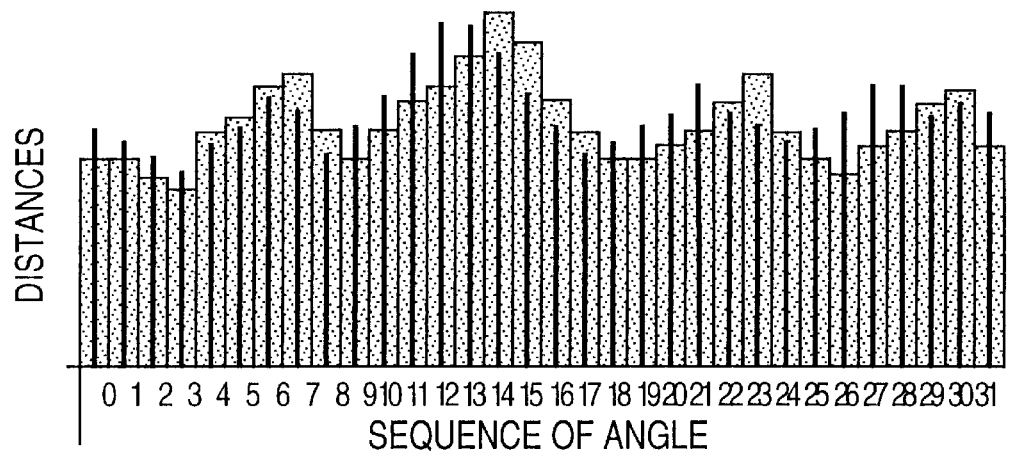
FIG. 9A illustrates the distances between a centroid and boundary pixels on a contour of the (k−1)th and (k)th frames according to sampled angles.
Figure 9B:
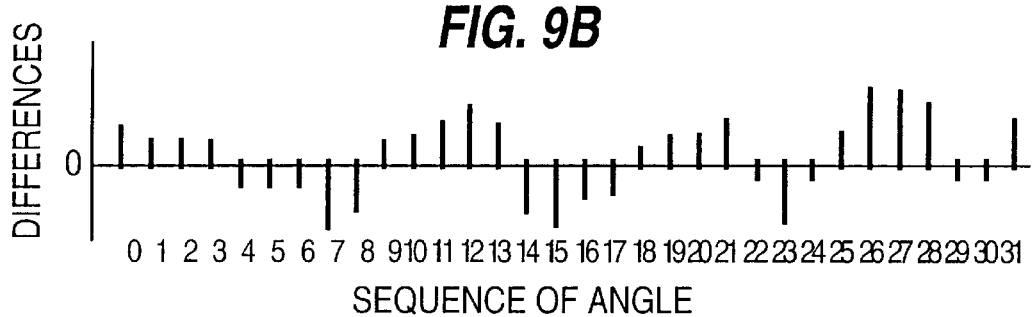
FIG. 9B illustrates respective distance differences.
Figure 9C:
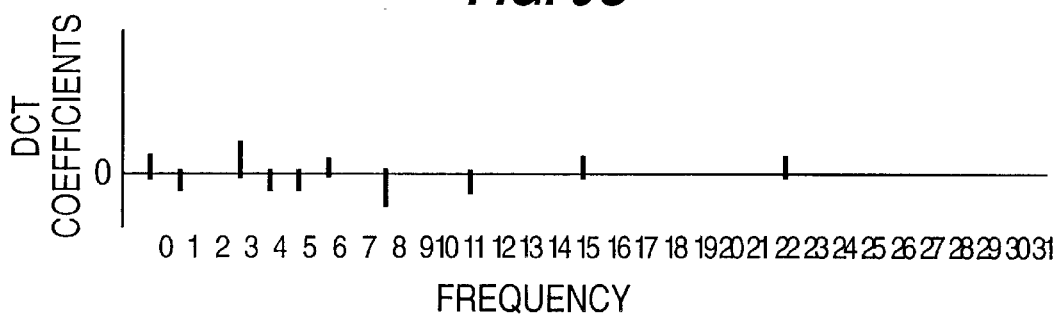
FIG. 9C illustrates the result of one-dimensional DCT-operation of the differences of FIG. 9B.

FIG. 9A illustrates the distances between a centroid and boundary pixels on a contour of the (k−1)th and (k)th frames according to sampling angle sequence, FIG. 9B illustrates respective distance differences and FIG. 9C illustrates the result of a one-dimensional DCT-operation of the differences of FIG. 9B.

Figure 10:
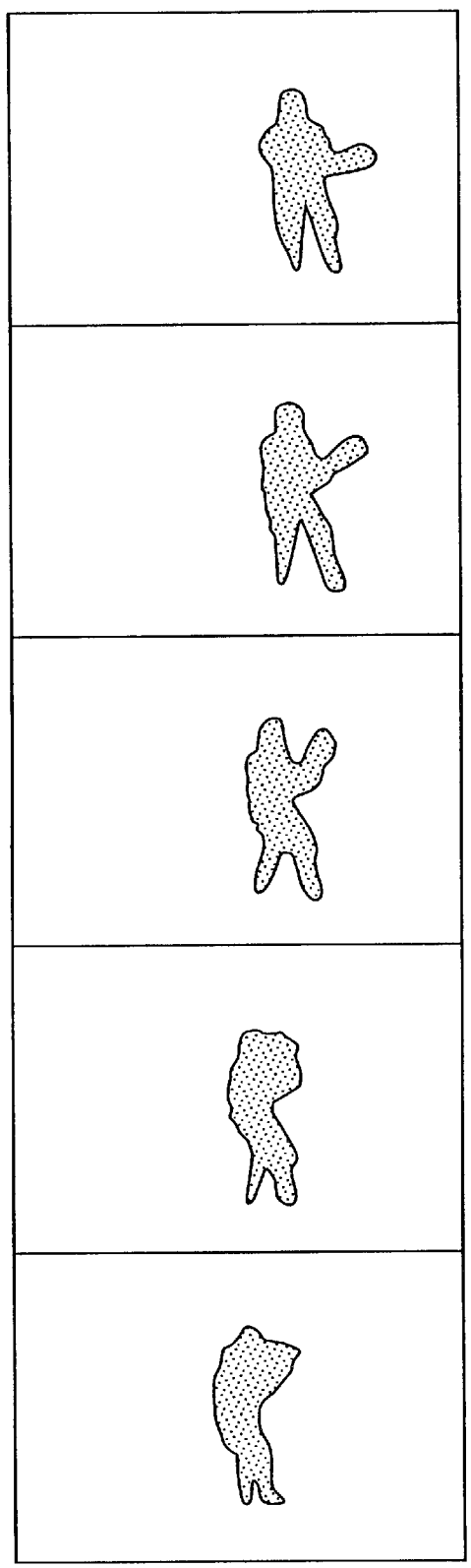
FIG. 10 illustrates an example of an original image used in an experiment.
Figure 11:
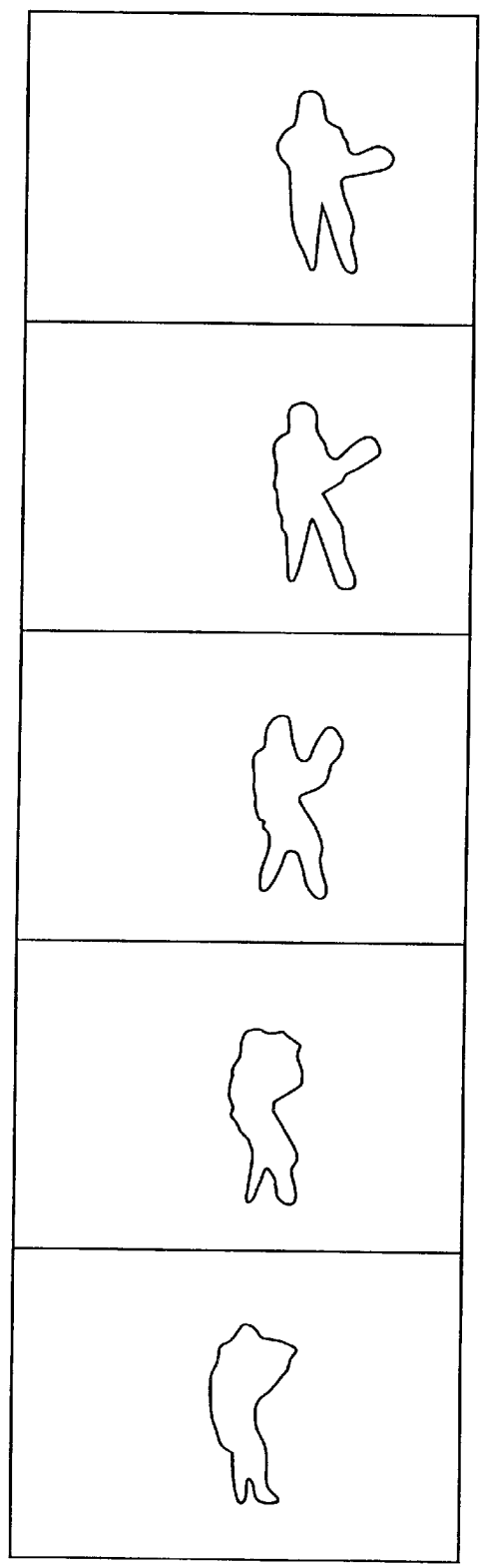
FIG. 11 illustrates an example of an image decoded and represented based on the original image of FIG. 10.

FIG. 10 illustrates original contours of a tennis player in a test moving picture, so called, "stefan" and FIG. 11 illustrates a picture coded and then restored from the picture of FIG. 10 by using the coding and decoding devices of the present invention.

As described above, according to the centroid-based object contour coding method and device of the present invention, a single coordinate is coded during contour coding for a still image. In the case of a moving picture, the distances between a centroid and boundary pixels on a contour is calculated and DCT-operated so that only the differences of the coordinate of the centroid and the distances between a previous frame image and a current frame image are encoded, thereby rendering a more accurate contour representation and providing an increased compression effect.

Further, since the present invention can be simply extended to inter-frame coding for video images, contour coding for moving pictures as well as still images can be efficiently performed.

Korean Application Serial No. 1996-8020, filed on Mar. 23, 1996, is incorporated by references herein.

What is claimed is:

1. A centroid-based object contour encoding method comprising the steps of:

(a) determining a centroid of an object;

(b) determining an incrementing angle for sampling;

(c) obtaining distances between the centroid and a plurality of boundary pixels on a contour of the object at angular positions spaced by the incrementing angle; and (d) encoding the distances and a coordinate of the centroid.

2. A centroid-based object contour encoding method as claimed in claim 1, wherein the centroid ($C_x, C_y$) determined in step (a) is defined by $$C_x = \frac{\sum_{i,j} k_{(i,j)} i}{\sum_{i,j} k_{(i,j)}}$$

$$C_y = \frac{\sum_{i,j} k_{(i,j)} j}{\sum_{i,j} k_{(i,j)}}$$

where (i,j) is a coordinate of a point in a region in which the object is included, and $k_{(i,j)}$ equals "1" when (i,j) falls inside the object and equals "1" otherwise.

3. A centroid-based object contour encoding method as claimed in claim 1, wherein step (a) further comprises:

determining a pseudo-centroid, when the centroid does not fall inside the object, the pseudo-centroid comprising a central point among a plurality of points inside the object and positioned along a line, wherein the line passes through (i) the centroid, and (ii) a geometrical center of a minimum rectangle encompassing the object.

4. A centroid-based object contour encoding method as claimed in claim 1, wherein the incrementing angle is adjusted according to object size and contour complexity.

5. A centroid-based object contour encoding method as claimed in claim 1, wherein step (c) further comprises choosing a farthest pixel as a boundary pixel, when there are a plurality of pixels on the contour at a single angle.

6. A centroid-based object-contour encoding method as claimed in claim 1, wherein the distances are obtained sequentially at said angular positions.

7. A centroid-based object contour encoding method comprising the steps of:
(a) determining a centroid of an object;
(b) determining an incrementing angle for sampling;
(c) obtaining distances between the centroid and a plurality of boundary pixels on a contour of the object at angular positions spaced by said incrementing angle;
(d) repeating steps (a) through (c) for a plurality of sequential frames;
(e) encoding the difference between (i) the distances of step (c) in a frame of the plurality of sequential frames, and (ii) the distances of step (c) in a previous frame of the plurality of sequential frames; and
(f) encoding the difference between (i) a coordinate of the centroid of the object in the frame and (ii) a coordinate of the centroid of the object in the previous frame.

8. A centroid-based object contour encoding method as claimed in claim 7, wherein the centroid $(C_x, C_y)$ determined in step (a) is defined by $$C_x = \frac{\sum_{i,j} k_{(i,j)} i}{\sum_{i,j} k_{(i,j)}}$$

$$C_y = \frac{\sum_{i,j} k_{(i,j)} j}{\sum_{i,j} k_{(i,j)}}$$

where (i,j) is a coordinate of a point in a region in which the object is included, and $k_{(i,j)}$ equals "1" when (i,j) falls inside the object and equals "0" otherwise.

9. A centroid-based object contour encoding method as is claimed in claim 7, wherein step (a) further comprises:
determining a pseudo-centroid, when the centroid does not fall inside the object, the pseudo-centroid comprising a central point among a plurality of points inside the object and positioned along a line, wherein the line passes through (i) the centroid, and (ii) a geometrical center of a minimum rectangle encompassing the object.

10. A centroid-based object contour encoding method as claimed in claim 7, wherein the incrementing angle is adjusted according to object size and contour complexity.

11. A centroid-based object contour encoding method as claimed in claim 7, wherein step (c) further comprises choosing a farthest pixel as a boundary pixel, when there are a plurality of pixels on the contour at a single angle.

12. A centroid-based object contour encoding method as claimed in claim 7, wherein the distances are obtained sequentially at said angular positions.

13. A centroid-based object contour encoding device comprising:
centroid determining means for determining a centroid inside an object;
incrementing angle determining means for determining an incrementing angle for sampling;
calculating means for obtaining distances between the centroid and a plurality of boundary pixels on a contour of the object at angular positions spaced by said incrementing angle; and
encoding means for encoding the distances and a coordinate of the centroid.

14. A centroid-based object contour encoding device as claimed in claim 13, wherein said centroid determining means determines the centroid $(C_x, C_y)$ defined by $$C_x = \frac{\sum_{i,j} k_{(i,j)} i}{\sum_{i,j} k_{(i,j)}}$$

$$C_y = \frac{\sum_{i,j} k_{(i,j)} j}{\sum_{i,j} k_{(i,j)}}$$

where (i,j) is a coordinate of a point in a region in which the object is included, and $k_{(i,j)}$ equals "1" when (i,j) falls inside the object and equals "0" otherwise.

15. A centroid-based object contour encoding device as claimed in claim 13, wherein said centroid determining means determines a pseudo-centroid, when the centroid does not fall inside the object, the pseudo-centroid comprising a central point among points which are inside the object and are positioned on a line, wherein the line passes through (i) the centroid, and (ii) a geometrical center of a minimum rectangle encompassing the object.

16. A centroid-based object contour encoding device as claimed in claim 13, wherein said incrementing angle determining means adjusts the incrementing angle according to object size and contour complexity.

17. A centroid-based object contour encoding device as claimed in claim 13, wherein said calculating means chooses a distance to a farthest pixel, when there are a plurality of boundary pixels on the contour at a single angle.

18. A centroid-based object contour encoding device as claimed in claim 13, wherein said calculating means obtains the distances sequentially at said angular positions.

19. A centroid-based object contour encoding device comprising:
distance extracting means for obtaining distances between a centroid of an object and a plurality of boundary pixels on a contour of the object at angular positions spaced by said incrementing angle, wherein said distance extracting means also outputs a plurality of sequential frames; and
means for encoding a first difference between (i) the distances of the centroid and the plurality of boundary pixels on a contour of the object in a frame of the plurality of frames and, (ii) the distances of the centroid and the plurality of boundary pixels on a contour of the object in a previous frame of the plurality of frames, and
wherein the means for encoding further encodes a second difference between (i) a coordinate of the centroid of the object in the frame and (ii) a coordinate of the centroid of the object in the previous frame.

20. A centroid-based object contour encoding device according to claim 19, wherein said encoding means further comprises:

a discrete cosine transform (DCT) circuit for performing a DCT with respect to the first distance and second distance, and for outputting a result of the DCT as DCT data;

a quantizer for quantizing the DCT data and for outputting quantized DCT data;

a variable-length coder for variable length coding the quantized DCT data.

21. A centroid-based object contour encoding device as claimed in claim 19, wherein said distance extracting means determines the centroid $(C_x, C_y)$ defined by $$C_x = \frac{\sum_{i,j} k_{(i,j)} i}{\sum_{i,j} k_{(i,j)}}$$

$$C_y = \frac{\sum_{i,j} k_{(i,j)} j}{\sum_{i,j} k_{(i,j)}}$$

where (i,j) is a coordinate of a point in a region in which the object is included, and $k_{(i,j)}$ equals "1" when (i,j) falls inside the object and equals "0" otherwise.

22. A centroid-based object contour encoding device as claimed in claim 19, wherein said centroid determining means determines a pseudo-centroid, when the centroid does not fall inside the object, the pseudo-centroid comprising a central point among points which are inside the object and are positioned on a line, wherein the line passes through (i) the centroid, and (ii) a geometrical center of a minimum rectangle encompassing the object.

23. A centroid-based object contour encoding device as claimed in claim 19, wherein said distance extracting means adjusts the incrementing angle according to object size and contour complexity.

24. A centroid-based object contour encoding device as claimed in claim 19, wherein said distance extracting means chooses a distance to a farthest pixel, when there are a plurality of boundary pixels on the contour at a single angle.

25. A centroid-based object contour encoding device as claimed in claim 19, wherein said distance extracting means obtains the distances sequentially at said angular positions.

* * * * *